United States Patent [19]

Brundage

[11] Patent Number: 5,063,805
[45] Date of Patent: * Nov. 12, 1991

[54] COMPOUND MITER SAW

[75] Inventor: Richard B. Brundage, St. Louis County, Mo.

[73] Assignee: Emerson Electric Co., St. Louis, Mo.

[*] Notice: The portion of the term of this patent subsequent to Jun. 19, 2007 has been disclaimed.

[21] Appl. No.: 433,147

[22] Filed: Nov. 8, 1989

[51] Int. Cl.$^5$ .................. B27B 5/24; B27B 27/06
[52] U.S. Cl. .................. 83/468.3; 83/468.7; 83/471.3; 83/490; 83/581
[58] Field of Search .................. 83/397, 468.3, 468.7, 83/471.3, 478, 490, 581, 393, 391

[56] References Cited

U.S. PATENT DOCUMENTS

| | | | |
|---|---|---|---|
| 3,821,918 | 7/1974 | Niehaus et al. | 83/471.3 |
| 4,002,094 | 1/1977 | Erickson et al. | 83/471.3 |
| 4,011,782 | 3/1977 | Clark et al. | 83/471.3 |
| 4,211,134 | 7/1980 | Thorsell et al. | 83/471.3 |
| 4,245,533 | 1/1981 | Batson | 83/471.3 |
| 4,452,117 | 6/1984 | Brickner et al. | 83/471.3 X |
| 4,559,857 | 12/1985 | Grossmann et al. | 83/471.3 |
| 4,638,700 | 1/1987 | Fushiya et al. | 83/490 X |
| 4,934,233 | 6/1990 | Bundage et al. | 83/397 |

Primary Examiner—Douglas D. Watts
Assistant Examiner—Eugenia A. Jones
Attorney, Agent, or Firm—Polster, Polster and Lucchesi

[57] ABSTRACT

An improved compound miter saw is disclosed as having a selectively rotatable turntable mounted on a supporting frame and a power driven saw blade pivotally mounted on the turntable between a lowered full cut position and a raised full retract position. The turntable is provided with a saw blade slot for receiving the power driven saw blade when lowered to its full cut position. A work supporting fence is mounted on the supporting frame and turntable and includes a pair of work engaging surfaces longitudinally aligned across the saw blade slot. The work supporting fence is constructed to provide simultaneous longitudinal and transverse movement relative to the power driven saw blade so as to maintain the work supporting fence in a predetermined relative position to the power driven saw blade as the turntable and included power driven saw blade are selectively rotated on the supporting frame to various desired miter positions. The compound miter saw is further constructed to provide selective releasable engagement of the turntable and included power driven saw blade with respect to the supporting frame at various pre-selected miter positions of the power driven saw blade relative to the work supporting fence. For this purpose, a leaf spring with self-locating ball detent mechanism is employed between the turntable and the supporting frame for selective releasable interengagement therebetween.

21 Claims, 7 Drawing Sheets

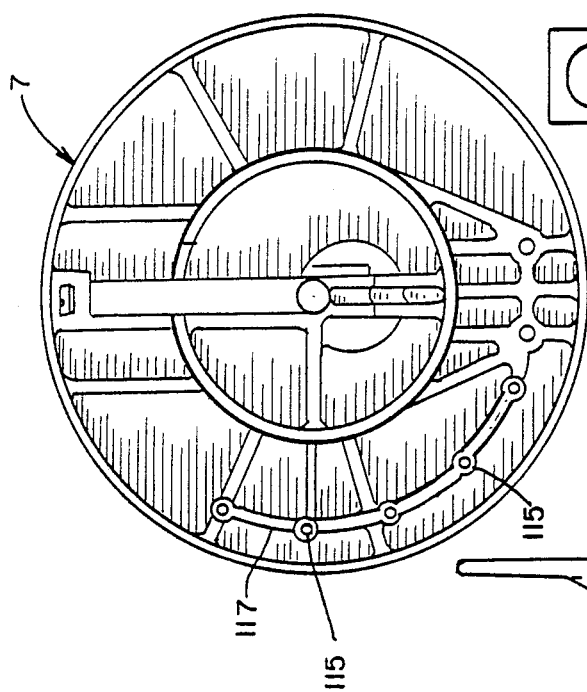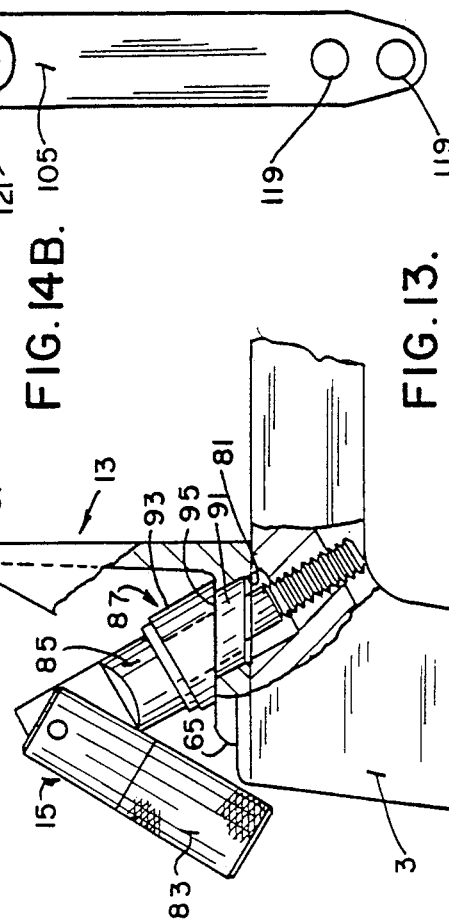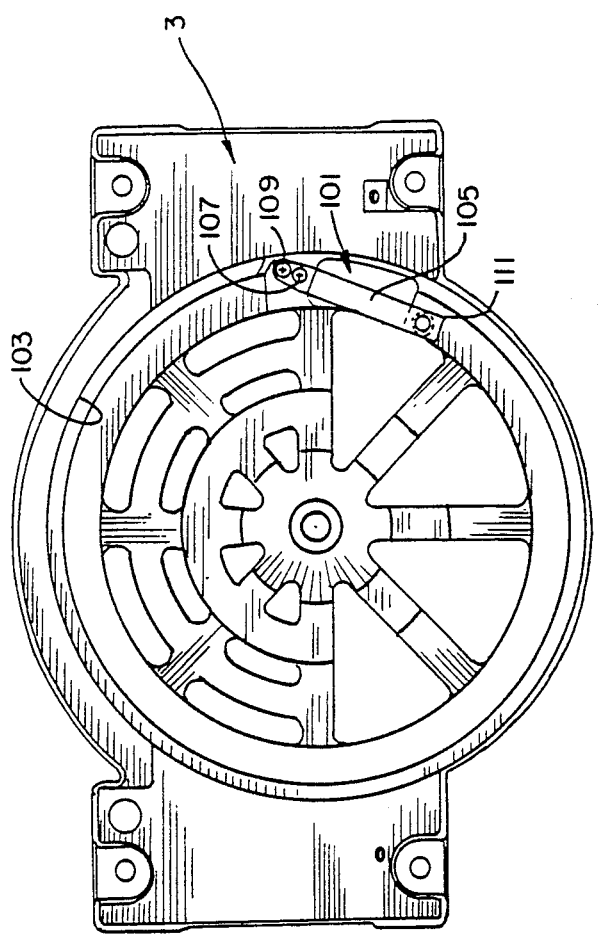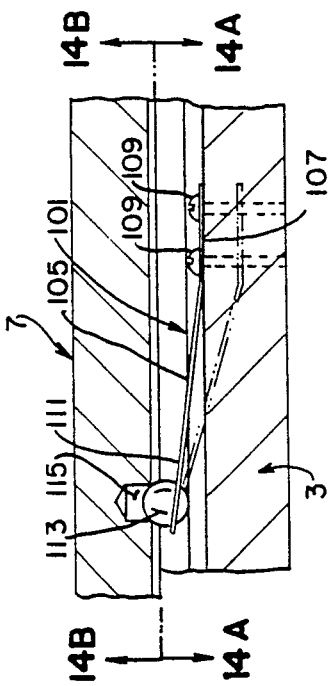

COMPOUND MITER SAW

CROSS REFERENCES TO RELATED APPLICATION

This is a related co-pending application to Ser. No. 213,277 filed Jun. 29, 1988 entitled COMPOUND MITER SAW invented by Richard B. Brundage and Richard L. Mitchell, now U.S. Pat. No. 4,934,233, which is assigned to the same assignee as the present invention.

BACKGROUND OF THE INVENTION

The present invention relates to an improved compound miter saw having a work supporting fence which has automatically adjustable combined transverse and longitudinal movement relative to various miter positions of a power driven saw blade, and also having an improved miter detent mechanism for selective releasable engagement between the turntable and supporting frame of the compound miter saw.

In the aforementioned co-pending patent application, the subject matter of which is incorporated herein by reference thereto, there is disclosed a compound miter saw in which a number of specific improvements are disclosed and claimed. Specifically, the improvements include a work supporting fence that is maintained in alignment with a turntable saw blade slot while the turntable, including the associated saw blade slot, is positioned for desired miter cuts. The work supporting fence is also constructed in that design for accurate and effective clamping relative to the supporting frame in both front and rear work supporting fence positions. Other improvements include a swinging blade guard that facilitates access to the saw blade shaft while precluding interference with bevel cuts and closed cylinders between the turntable and saw providing pivotal movement of the saw while also permitting bevel pivotal adjustment of the saw relative to the turntable.

The aforementioned compound miter saw and the above described improvements were developed primarily for use in conjunction with a 10" compound miter saw that affords substantial cutting capacity, including bevel cutting a 2×6 board and compound angle cutting a 2×4 board. Where it is desired to scale-down the compound miter saw so as to provide marketing access to consumers at a lower price point, some of the features incorporated in the aforementioned compound miter saw can not be utilized in a scaled down version because certain features are too costly. At the same time, it is important that as many of the advantages inherent in the aforementioned compound miter saw be utilized in a scaled down version, to the extent possible.

The present invention strikes a balance between features and cost in a scaled down version of an improved compound miter saw. Specifically, the present invention has been constructed primarily, although not exclusively for use with an 8¼" power driven saw blade, to provide compound coordinated, automatically adjustable two axis motion for a work supporting fence relative to a power driven saw blade so as to maximize the capacity of the work to be cut, even including miter and bevel cutting of 2×4 boards and bevel cutting of 2×6 boards. Additionally, the present invention offers an improved miter detent mechanism for selective releasable engagement between the turntable and supporting frame. Furthermore, it has been discovered that some or all of the features of the present invention may be desirably employed in other compound miter saw constructions, including larger diameter and more highly powered and more sophisticated compound miter saws, if desired.

SUMMARY OF THE INVENTION

Among the several objects and advantages of the present invention include:

An improved compound miter saw incorporating features that are substantial improvements over all prior art constructions;

The aforementioned improved compound miter saw which includes a work supporting fence position-driven by a turntable and having a predetermined relative position to a power driven saw blade as the turntable included power driven saw blade are selectively rotated to various desired miter positions;

The aforementioned improved compound miter saw in which the work supporting fence is constructed to afford compound coordinated movement in a two axis motion relative to the power driven saw blade so as to maintain the work supporting fence in a predetermined relative position to the power driven saw blade;

The aforementioned improved compound miter saw which provides automatically adjustable combined transverse and longitudinal movement thereof relative to a power driven saw blade throughout various desired miter positions;

The aforementioned improved compound miter saw having a structurally supported work supporting fence during movement thereof;

The aforementioned improved compound miter saw having an improved miter detent mechanism for selective releasable engagement between the turntable and supporting frame;

The aforementioned improved compound miter saw in which the improved miter detent mechanism provides improved selective releasable engagement between a turntable and supporting frame for superior feel during movement, as well as accurate positioning and zero slop tolerance;

The aforementioned improved compound miter saw which is constructed to provide improved manufacturability of components for lower cost, better operation, lower maintenance, while also being otherwise well adapted for the purposes intended.

Briefly stated, the compound miter saw apparatus of the present invention includes a supporting frame and a turntable selectively rotatably mounted on the supporting frame. A power driven circular saw blade is pivotally mounted on the turntable along a predetermined path relative to the turntable, and a saw blade slot is provided in the turntable for receiving the saw therein. A work supporting fence is mounted on the supporting frame and includes a pair of work engaging surfaces longitudinally aligned across the saw blade slot. The work supporting fence includes means for simultaneous coordinated or automatically adjustable movement both longitudinally and transversely relative to the power driven saw blade so as to maintain the work supporting fence in a predetermined relative position to the power driven saw blade as the turntable and included power driven saw blade are selectively rotated on the supporting frame to various desired miter positions.

The turntable is selectively rotated on the supporting frame to the various desired miter positions of the power driven saw blade. The means associated with the work supporting fence for the aforementioned simultaneous coordinated longitudinal and transverse movement is mounted for movement relative to the turntable.

Specifically, the work supporting fence is rotatably mounted to the turntable at a location eccentrically offset from the center of axis of rotation of the turntable. The work supporting fence is also mounted for movement in a curvilinear path at opposite ends thereof to the supporting frame in order to provide the aforementioned automatically adjustable combined longitudinal and transverse movement. Opposite ends of the work supporting fence include curvilinear cam slots for receiving a cam shaft member therein. Each cam shaft member is attached to the supporting frame for controlling the movement of the work supporting fence along the curvilinear slots at each end thereof. Each cam shaft includes a cam bushing slidably mounted within an associated curvilinear slot of the work supporting fence. Each cam bushing further includes a first portion slidably mounted within an associated curvilinear slot and a second portion also slidably mounted relative to the work supporting fence above and in the vicinity of the associated curvilinear slot. Each curvilinear cam slot includes a curvilinear edge for cooperative sliding mating engagement with an associated cam bushing.

The cam shaft and associated cam bushing for each curvilinear cam slot are angularly positioned relative to the supporting frame and include an angularly offset surface between the first and second portions of each cam bushing for cooperative engagement with the work supporting fence above and in the vicinity of an associated curvilinear cam slot. Each cam shaft member and associated bushing are adjustably threadably mounted relative to the turntable.

The work supporting fence is also structurally supported by the turntable during movement thereof relative to the power driven band saw.

The work supporting fence includes an interconnecting web section between the pair of work engaging surfaces. The interconnecting web section includes a depending element that is partially circularly shaped for reception within a complementary shaped opening provided in the turntable so as to rotatably mount the work supporting fence relative to the turntable. The saw blade slot in the turntable includes an elongated slot for receiving the saw blade and an adjacent opening connected to the elongated slot underlying the work supporting fence. The work supporting fence has a complementary opening generally vertically aligned with the adjacent opening of the saw blade slot in the turntable.

In order to provide selective releasable engagement between the turntable and included power driven saw blade relative to the supporting frame at various pre-selected miter positions, spring-biased self-locating detent means are provided for selective releasable interengagement between the turntable and the supporting frame.

The detent means includes a leaf spring attached at one end to the supporting frame and a ball detent positioned in a transverse slot at the free end of the leaf spring. The transverse slot is slightly larger in dimension perpendicular to turntable rotation than the ball detent to provide self-locating positioning of the ball detent relative to complementary configured holes formed in the turntable. The spring-biased self-locating detent means can also be described as providing leaf spring activated interengaging means between the supporting frame and turntable for interengagement with one another at the pre-selected miter positions. The leaf spring activated interengagement means includes the above described leaf spring and ball detent which are constructed to provide the selective releasable interengagement between the turntable and supporting frame.

These and other objects and advantages of the present invention will become apparent from the description that follows.

BRIEF DESCRIPTION OF THE DRAWINGS

In the drawings.

FIG. 13 is an enlarged fragmentary side elevational view, partially in section, illustrating the manner in which the work supporting fence is held in position relative to the supporting frame of the improved compound miter saw;

FIG. 14a is a top plan view illustrating the supporting frame of the present invention with the turntable removed and further depicting the leaf spring ball detent used in the miter detent mechanism of the present invention;

FIG. 14b is a bottom plan view of the turntable received within the supporting frame and illustrating a series of circumferentially spaced holes formed in the web section of the turntable for engagement by the leaf spring ball detent illustrated in FIG. 14a;

FIG. 15 is a fragmentary enlarged sectional view of the miter detent mechanism further illustrating the manner in which the leaf spring ball detent engages the complementary holes in the turntable for selective releasable engagement of the turntable and supporting frame relative to one another; and FIG. 16 is an enlarged top plan view of the leaf spring used in the miter detent mechanism of the present invention.

Corresponding reference numerals will be used throughout the several figures of the drawings.

DESCRIPTION OF THE PREFERRED EMBODIMENT

Figure 1:
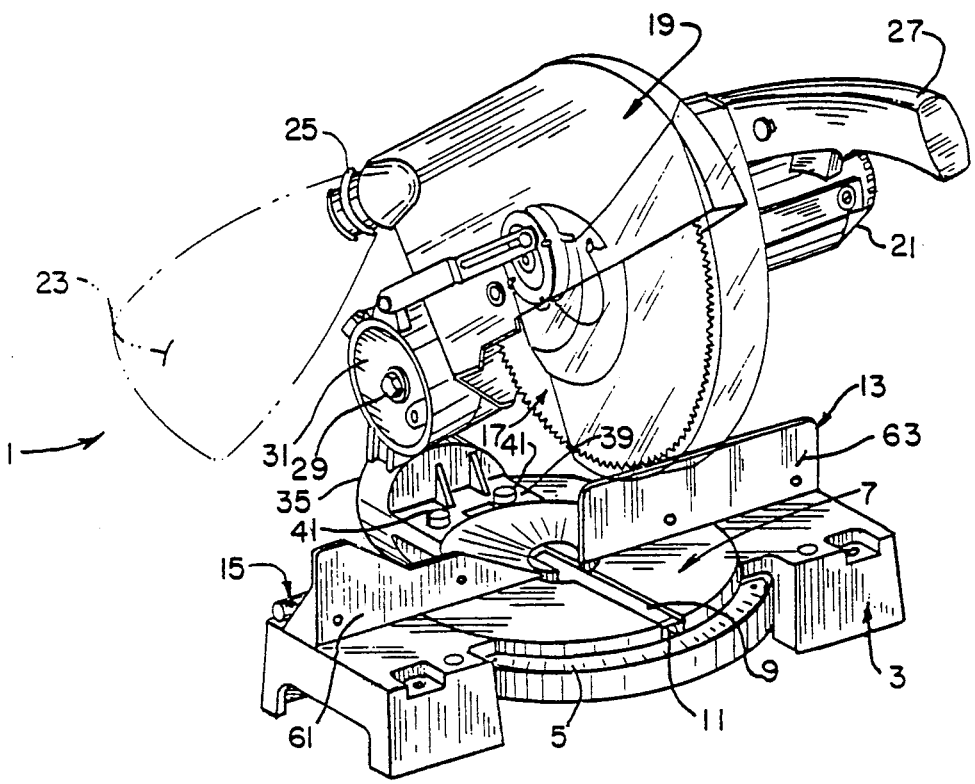
FIG. 1 is a front perspective view of the improved compound miter saw which is constructed in accordance with the teachings of the present invention, with the saw in raised full retract position.

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

Many of the components of the present invention are similar to those disclosed in aforementioned co-pending U.S. Patent application Ser. No. 213,277 filed Jun. 29, 1988, now U.S. Pat. No. 4,934,233. Therefore, before discussing the specific improved features of the present invention, a general background understanding of the principal components of the compound miter saw and the manner in which they cooperate together to achieve the desired miter/bevel cuts in workpieces will be explained to provide a background setting for the specific improvements of the present invention.

As best seen in FIGS. 1-8 of the drawings, the improved compound miter saw 1 of the present invention includes a supporting base or frame 3 having an arcuate miter scale 5 attached to an upper semi-circularly shaped front portion thereof for ease of use and visibility by the user. A turntable 7 is selectively rotatably mounted to the supporting frame or base 3 through the centrally located rotatable mount 8 (see FIGS. 4 and 9-10). The turntable 7 is further provided with a saw blade slot 9 therein, and a miter scale pointer 11 is affixed to the turntable 7 within the outermost portion of the saw blade slot 9 for use with the arcuate miter scale 5 in determining the angle of miter from a fixed reference point at 0°. Typically, the turntable is rotatable from a 0° reference point to either side thereof for miter bevel cuts up to 45° minimum on either side of the 0° reference point.

In order to hold and support work pieces in accurate aligned and squared position in the compound miter saw 1, a work supporting fence 13 is provided. The work supporting fence 13 includes fence lock handles 15 for mounting the work supporting fence 13 to the supporting frame 3, while also being rotatably mounted to the turntable 7, as will be discussed further in substantial detail below.

A power driven saw blade 17 is rotatably mounted within the upper blade guard and housing 19, and is power driven by an electric motor 21 that is mounted to the right side of the upper blade guard and housing 19, as shown in the drawings. For collecting dust and other debris generated from cut work pieces, a dust bag 23 may be attached to an exhaust outlet 25 at the rear of the upper blade guard and housing 19. The upper blade guard and housing 19 further includes a handle 27 for raising and lowering the power driven saw blade 17 from a upper full retract position to a lowered full cut position, as desired. The handle 27 is also useful in rotating the turntable 7, as will be described.

The construction and operation of the upper blade guard and housing 19, including the swinging blade guard assembly, is described in substantial detail in the aforementioned co-pending patent application, and reference is made to that disclosure for such additional details as may be necessary to fully understand the construction and operation of such components.

The upper blade guard and housing 19, including all other related components described above, are pivotally mounted along the pivot axis 29 for pivotally moving the power driven saw blade 17 as it is moved from an upper full retract position to a lower full cut position. The pivot axis 29 comprises a bolt which extends through the upper cylindrically shaped section 31 of the upper blade guard and housing 19, as well as through a complementary shaped interfitting and mirror image upper cylindrical section 33 (see FIG. 2). Between these two cylindrical sections 31, 33 is a confined torsional spring, shown in the aforementioned prior co-pending patent application, for normally urging the upper blade guard and housing 19, as well as the powered driven saw blade 17 to an upper at rest position. When the handle 27 is depressed to lower the power driven saw blade 17, the upper cylindrically shaped section 31, which is integral with the upper blade guard and housing 19, will rotate relative to the complementary and mirror image shaped upper cylindrical section 33 about the pivot bolt axis 29, to allow the power driven saw blade 17 to be moved to an operational position. When the handle 27 is released, the torsional spring between the two cylindrical sections 31, 33 operates to cause the cylindrical section 31 to pivot about the pivot bolt 29, relative to the corresponding cylindrically shaped sections 33, in a reverse direction, in order to raise the upper blade guard and housing 19, together with the power driven saw blade 17, to an upper full retract position.

The upper cylindrically shaped section 31, in addition to permitting relative pivotal movement of the cylindrically shaped section 33 relative to it, along with the other components of the upper blade guard and housing 19, is also integrally mounted to the lower transversely extending cylindrically shaped section 35, which, in turn, is rotatably mounted relative to a mirror image cylindrical section 37, for bevel adjustment of the compound miter saw. Specifically, the lower cylindrical section 37 includes a transverse flange 39 extending therefrom (see FIG. 5) for fixedly mounting the cylindrical section 37 directly to the turntable 7 by way of the bolts 41. The lower cylindrical section 37 is pivotally mounted to the lower cylindrical section 35 by way of the pivot bolt 43, and a bevel lock handle 45 is loosened or tightened for movement to various positions along the elongated slot 47 in the lower cylindrical section 35 (see FIG. 8) for relative rotatable movement to the fixed lower cylindrical section 37. The rotatable lower cylindrical section 35 includes a pointer 49 for desired bevel positioning relative to the scale 51, which is attached to the outer surface of the fixed lower cylindrical section 37. Thus, in addition to miter cuts, the compound miter saw 1 of the present invention also provides bevel cuts by rotatably positioning the lower cylindrical section 35 relative to the fixed lower cylindrical section 37, as the bevel lock handle 45 is loosened and tightened to various selective positions along the elongated slot 47. The desired bevel cut is visually determined by the pointer and scale 49, 51 attached respectively to the lower cylindrical section 3 and the fixed lower cylindrical section 37 (see FIG. 6).

For a more specific description of the components and operation of the upper closed cylinders 31, 33 and the lower closed cylinders 35, 37, reference is made to the above identified co-pending patent application. For purposes of the improved compound miter saw 1 of the present invention, it is important to note that the power driven saw blade 17 is pivotally mounted to the turntable 7 through the aforementioned construction, in order to permit the power driven saw blade 17 to be moved from an upper full retract position to a lower full cut position for cutting work pieces resting on the turntable 7, for a variety of miter and bevel cut positions, as desired.

Figure 2:
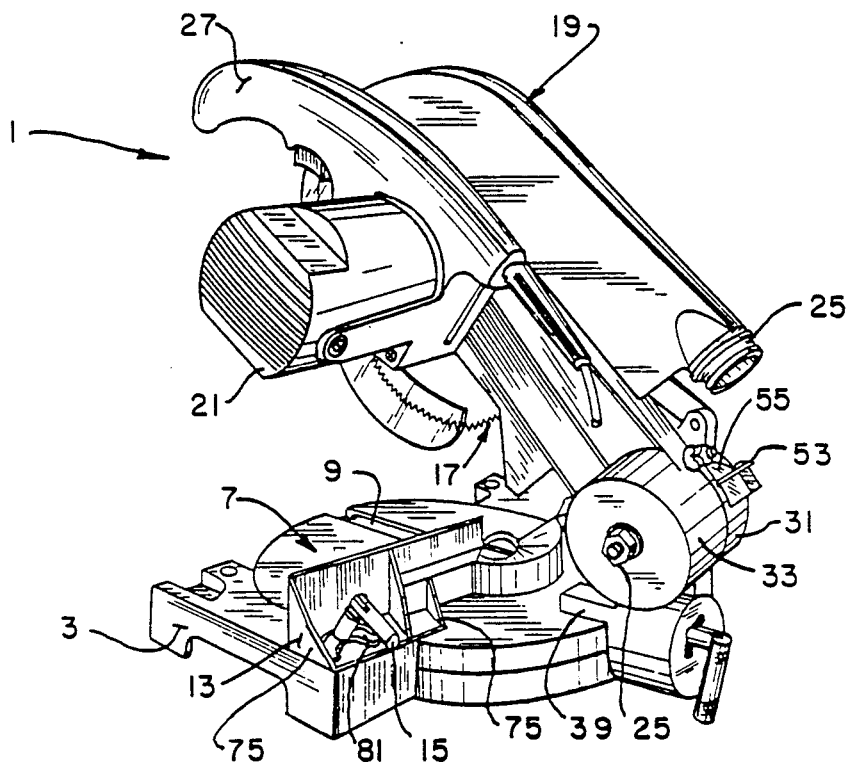
FIG. 2 is a rear perspective view of the improved compound miter saw, also with the saw in raised full retract position.
Figure 3:
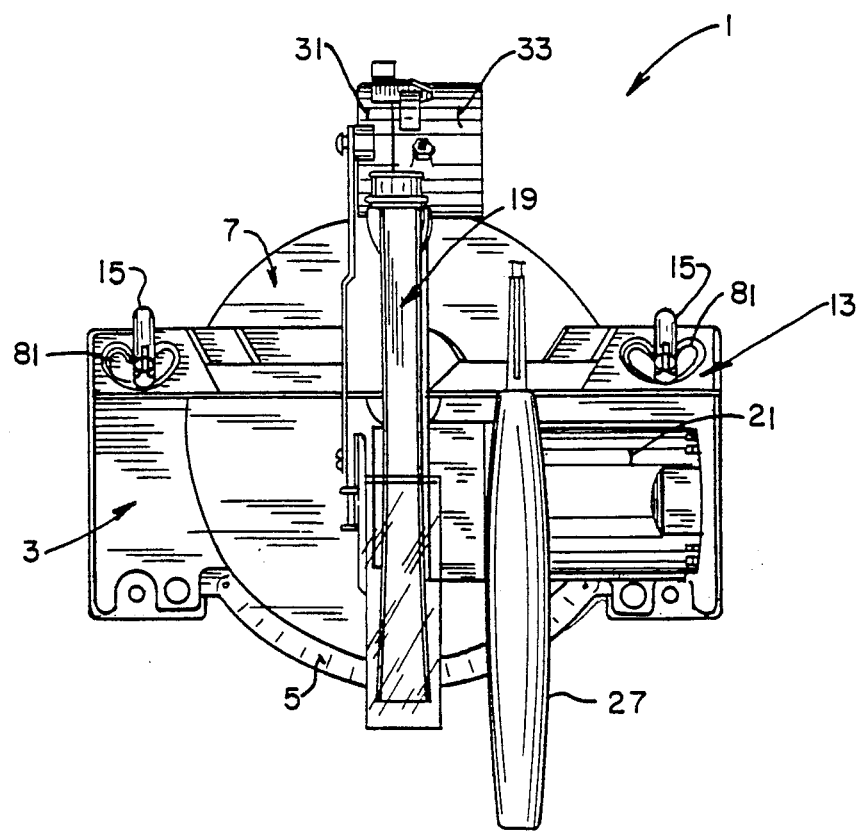
FIG. 3 is a top plan view of the improved compound miter saw.
Figure 4:
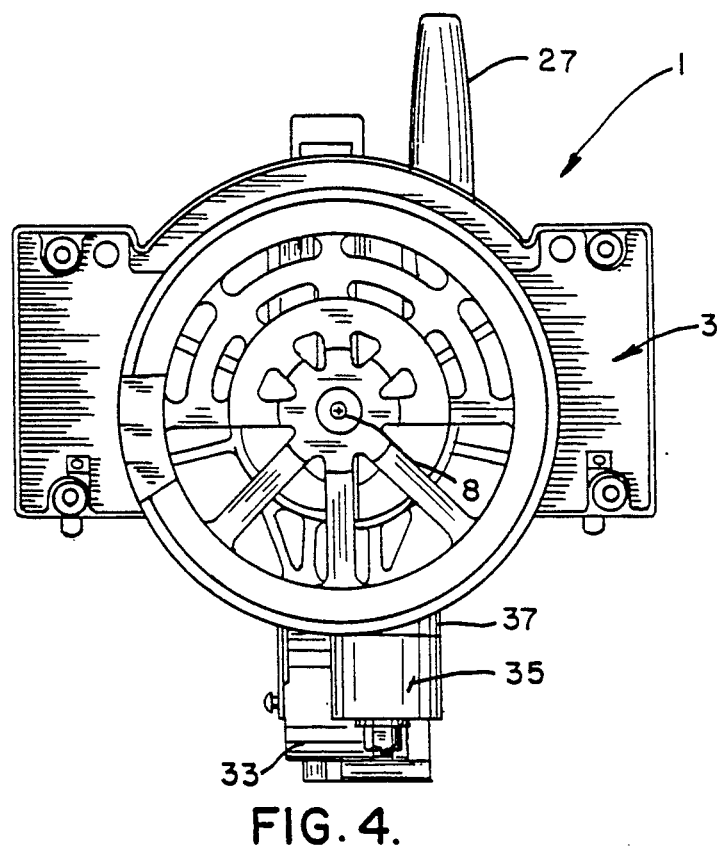
FIG. 4 is a bottom plan view of the improved compound miter saw.
Figure 5:
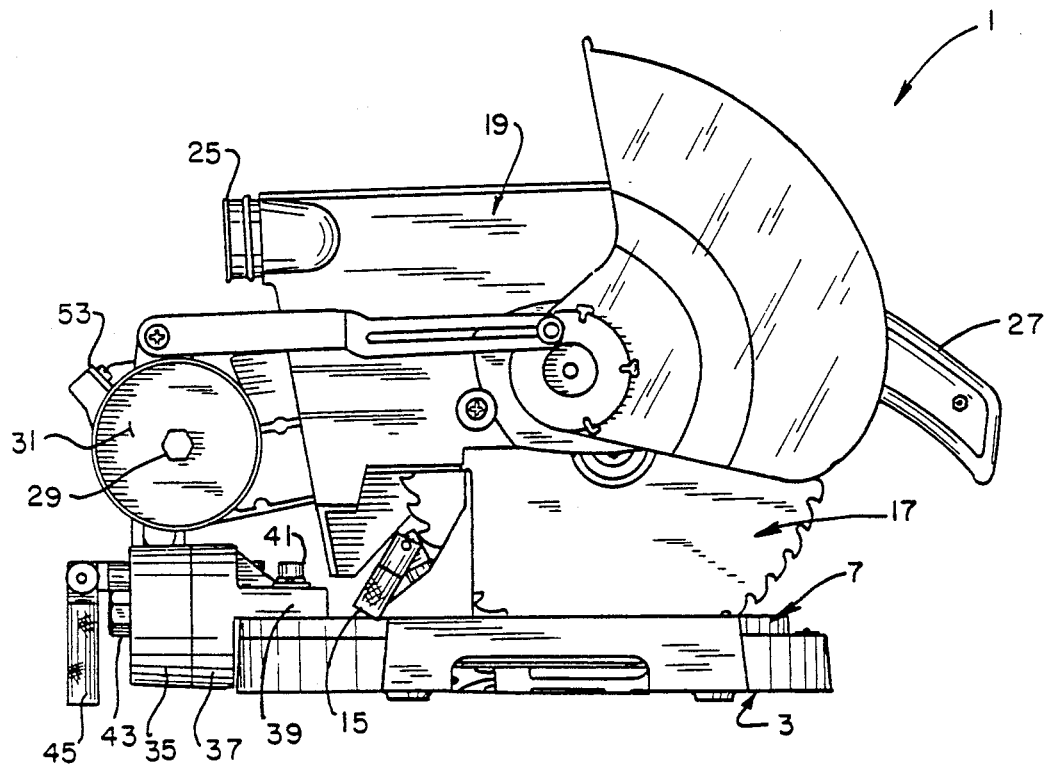
FIG. 5 is a left side elevational view of the improved compound miter saw in lowered full cut position.
Figure 6:
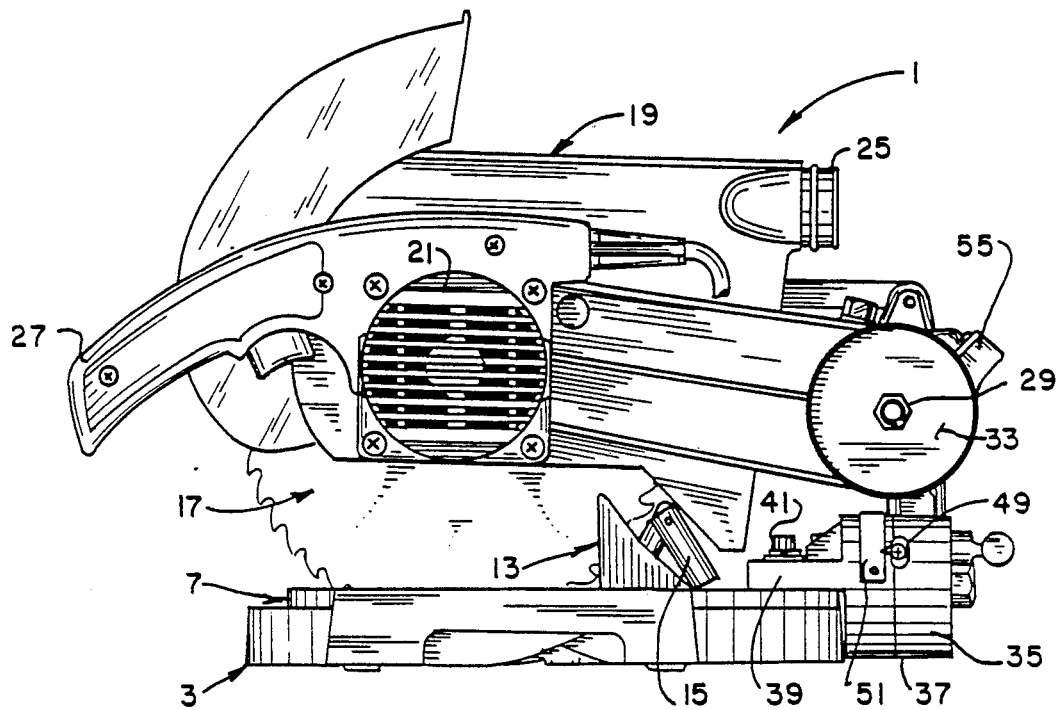
FIG. 6 is a right side elevational view of the improved compound miter saw, also in lowered full cut position.
Figure 7:
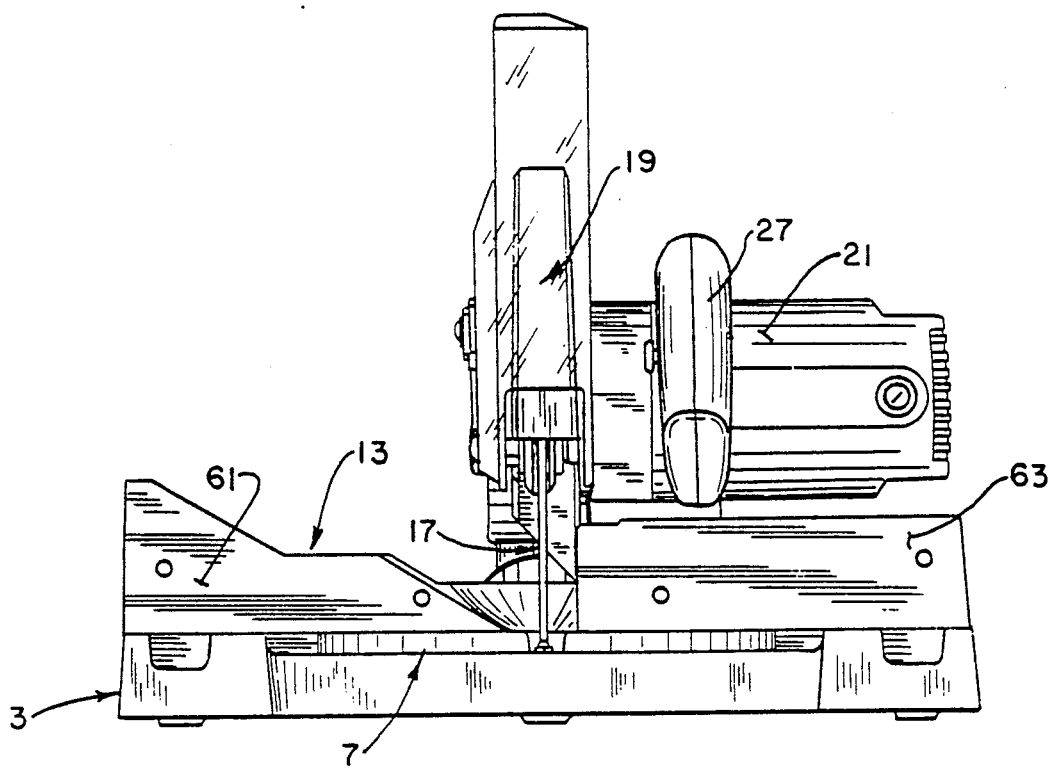
FIG. 7 is a front elevational view of the improved compound miter saw, also in lowered full cut position.
Figure 8:
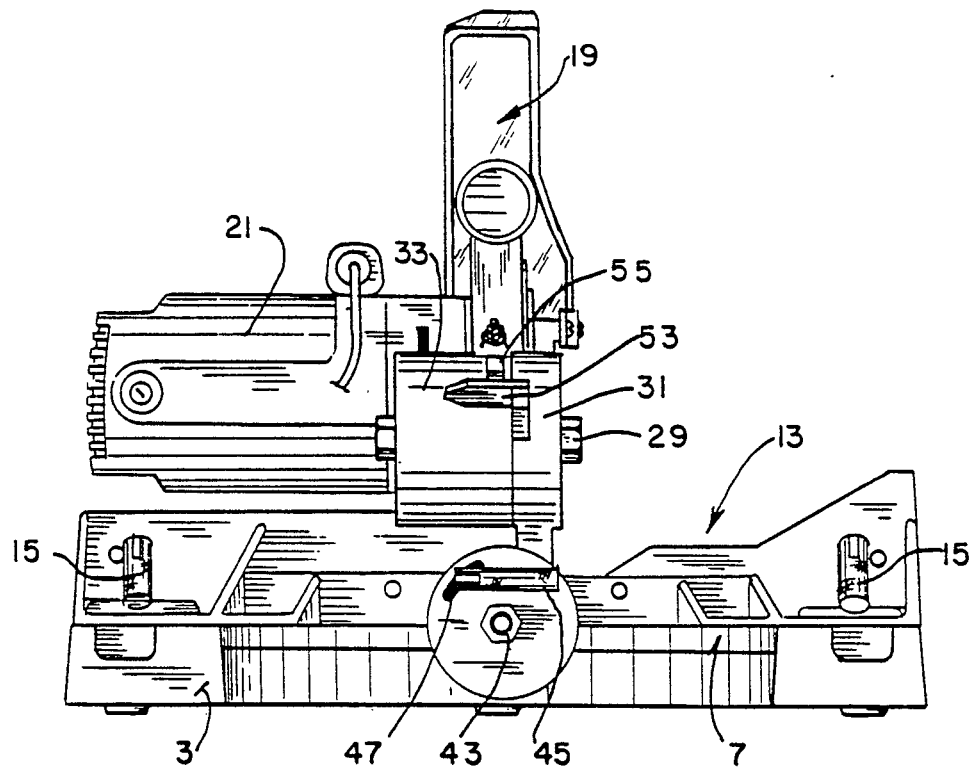
FIG. 8 is a rear elevational view of the improved compound miter saw also in lowered full cut position.

For shipping and storage purposes, as well as to keep the compound miter saw 1 in a collapsed position, a handle latch 53 is pivotally mounted to the upper cylindrical section 31 and is capable of being moved into engagement with a shoulder stop 55 of the upper cylindrical section 33, in order to maintain the upper blade guard and housing 19, and included components, in a fixed, lower position, as shown in FIGS. 5-8 of the drawings. The handle latch 53 may be rotated out of engagement relative to the shoulder stop 55, for operating the saw, and thereby allow the torsional spring (not shown) between the cylindrical housings 31 and 33 to move the upper blade guard and housing 19 to an upper full retract position, as shown in FIG. 1-2 of the drawings.

In light of the general understanding of the various components of the compound saw 1, as more fully explained in substantial detail in the above identified co-pending patent application, attention can now be focused on the specific description of the improvements of the present invention including the improved construction and operation of the work supporting fence 13 relative to the supporting frame 3 and turntable 7, as well as to the improved miter detent mechanism for selective releasable engagement between the turntable 7 and supporting frame 3.

First referring to the improved construction and operation of the work supporting fence 13 of the present invention, attention is now specifically directed to FIGS. 1-3, 5-6 and 9-12 of the drawings.

The work supporting fence 13 is constructed for coordinated simultaneous or automatically adjustable combined movement both longitudinally and transversely relative to the power driven saw blade 17 so as to maintain the work supporting fence in a predetermined relative position to the power driven saw blade 17 as the turntable 7 and included power driven saw blade 17 are selectively rotated on the supporting frame 3 to various desired miter positions. It will be noted that since the upper blade guard and housing 19, together with included handle 27, are supported through the lower closed cylinder 35 transverse flange 39 to the turntable 7 by the bolts 41, 41, the turntable 7 can be moved to the various desired miter positions by gripping and moving the handle 27 in the desired direction. This causes the turntable 7 and included saw blade slot 9 to be moved to the desired miter position along with the power driven saw blade 17. Thus, both the power driven saw blade 17 and the saw blade slot 9 will be moved in the same direction and to the same extent so that they will always be in aligned relationship with one another throughout the various desired miter positions.

Although the power driven saw blade 17 and the saw blade slot are moved together as the turntable 7 is rotated, the work supporting fence 13 is not necessarily moved in the same way. In the aforementioned prior co-pending patent application, a miter lock handle and included extension are pivotally connected to a work supporting fence so as to maintain the work supporting fence in an accurately fixed position relative to various miter positions desired. Suitable complementary shaped fan-shaped openings for the work supporting fence and the turntable are also employed along with rear and front fence positions in order to properly position the work supporting fence relative to a power driven saw blade and associated saw blade slot.

Although the present invention is a scaled down version of the compound miter saw disclosed in the aforementioned prior co-pending patent application, the work supporting fence 13 is constructed to permit automatically adjustable combined longitudinal and transverse movement thereof as the power driven saw blade 17 and associated saw blade slot 9 are moved to various desired miter positions. The improvements of the work supporting fence 13, now to be described, can also be employed in the compound miter saw of the aforementioned prior co-pending patent application, if desired.

Specifically, the work supporting fence 13 includes a spaced pair of generally vertically directed work engaging surfaces 61, 63 which are longitudinally aligned with one another across the saw blade slot 9. Each of the generally vertically directed work engaging surfaces 61, 63 are connected at a lower end thereof to a horizontally directed fence supporting section 65, 67, respectively (see FIG. 12). A projection 69 extends from each of the horizontally directed fence supporting sections 65, 67 for slidable engagement with the upper horizontal surface of the turntable 7. Each projection 69 also enables the work supporting fence 13 to be clamped against the turntable 7 as will be subsequently explained.

Figure 9:
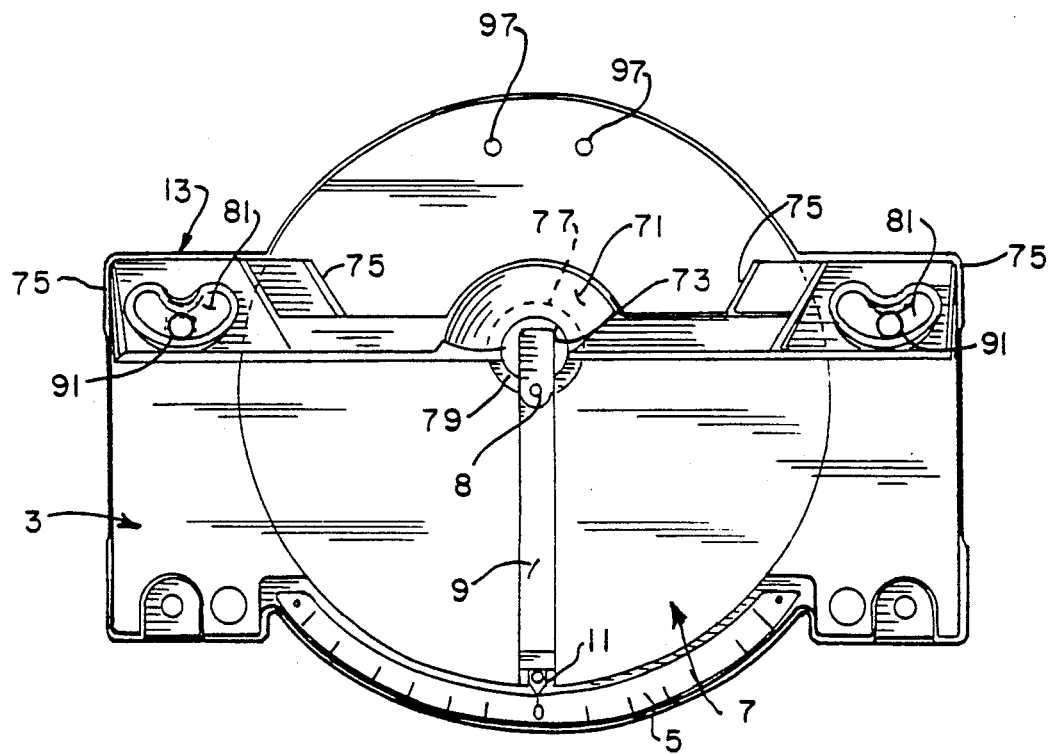
FIG. 9 is a top plan view of the manner in which the work supporting fence is mounted relative to the turntable and supporting frame of the improved compound miter saw, without other saw components.
Figure 10:
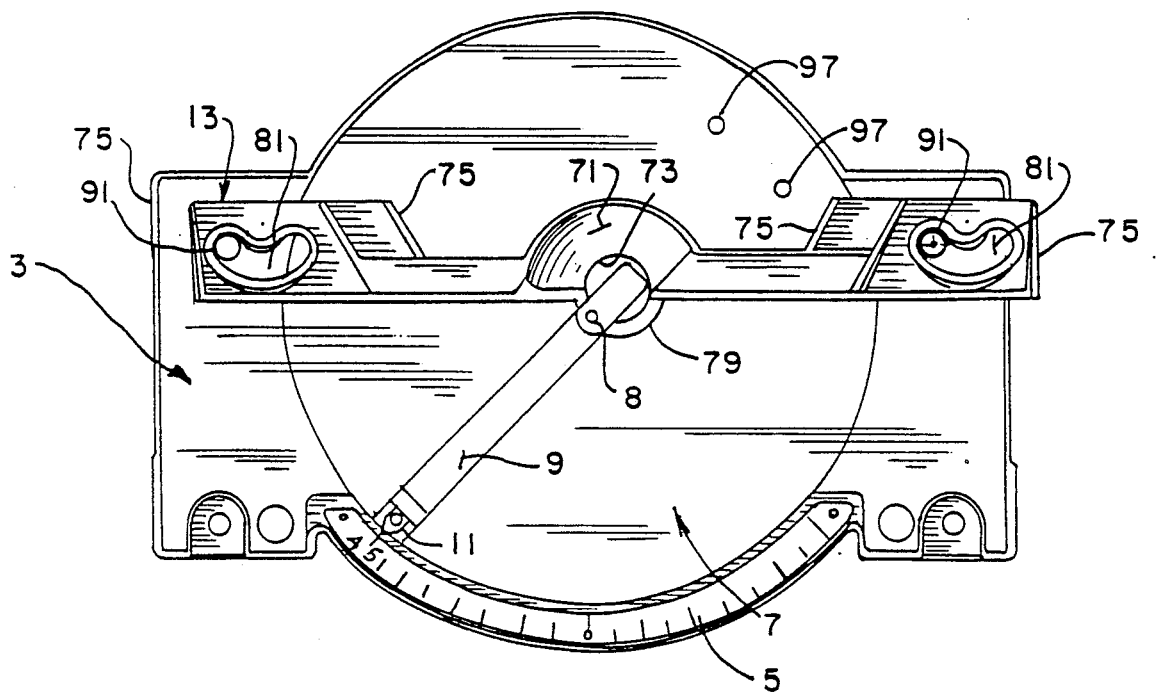
FIG. 10 is also a top plan view similar to FIG. 9, and further illustrating the manner in which the work supporting fence s automatically adjustable both transversely and longitudinally relative to a saw blade slot through which a power driven saw blade is operated.

The work supporting fence 13 further includes an interconnecting web section 71 which extends between the pair of work engaging surfaces 61, 63 and fence supporting sections 65, 67, respectively. This can be seen in FIGS. 11-12 of the drawings. The interconnecting web section 71 is a fan-shaped section opening 73 which is adapted to be generally vertically aligned with the saw blade slot 9. Thus, as can be appreciated, the power driven saw blade 17, when in lower full cut position, can be moved into the saw blade slot 9, without contacting the turntable 7 or the work supporting fence 13, as the result of the fan-shaped opening 73 which is complementary aligned relative to a portion of the saw blade slot 9, as shown in FIGS. 1 and 9-10. For integrally supporting the work engaging surfaces 61, 63 relative to the fence supporting sections 65, 67 a series of interconnecting struts 75 are employed as best seen in FIGS. 2 an 9-11 of the drawings.

In order to rotatably mount the work supporting fence 13 to the turntable 7, the interconnecting web section 71 includes a depending partially circularly-shaped element 77 for reception within a complementary shaped opening 79 provided in the turntable 7. Note; however, that while the turntable 7 is rotatably mounted as at 8 to the supporting frame 3, the work supporting fence 13 is pivotally or rotatably mounted to the turntable, through the depending element 77 and complementary opening 79, at a location eccentrically offset from the center of axis of rotation or rotatable mount 8 of the turntable 7. This offset mounting, along with the compound coordinated movement of the work supporting fence 13 at opposite ends thereof, provides the automatically adjustable combined longitudinal and transverse movement of the work supporting fence relative to the power driven saw blade 17 and its associated saw blade slot 9.

Figure 11:
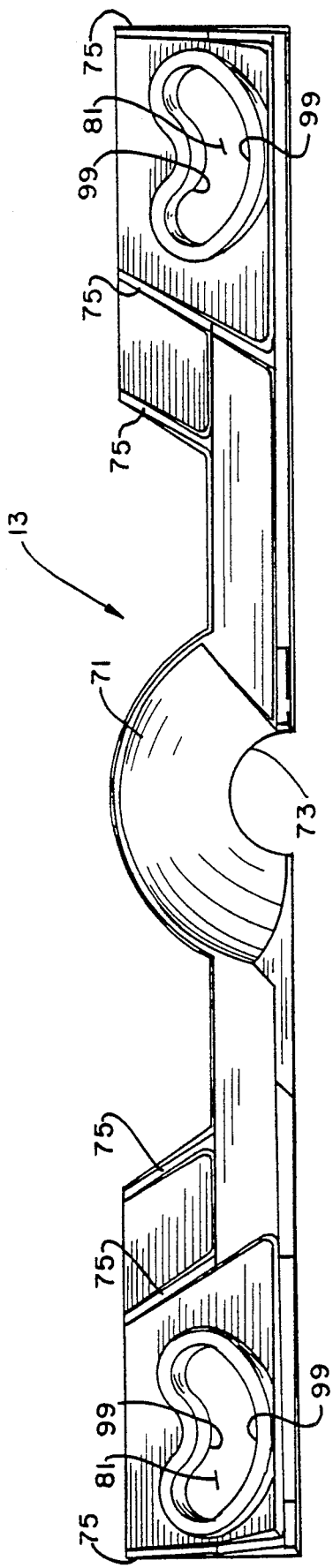
FIG. 11 is an enlarged top plan view of the work supporting fence used in the improved compound miter saw of the present invention.
Figure 12:
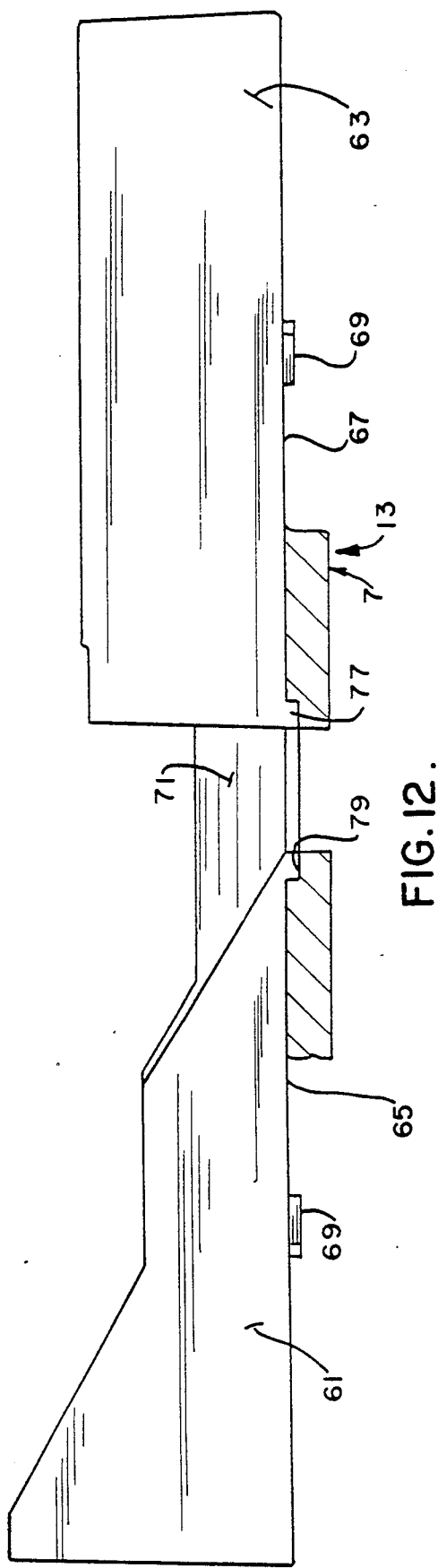
FIG. 12 is a front elevational view of the work supporting fence shown in FIG. 11.

Specifically, the work supporting fence 13 is constructed and mounted for movement in a curvilinear path at opposite ends thereof in order to cooperate with the offset rotatable mounting of the work supporting fence relative to the turntable 7 so as to maintain the work supporting fence 13 in a predetermined relative position to the power driven saw blade 17 and its associated saw blade slot 9, as the turntable 7 and included power driven saw blade 17 are selectively rotated on the supporting frame 3 to various desired positions. In order to move in such curvilinear paths at opposite ends thereof, the work supporting fence 13 is provided with curvilinear cam slots 81, 81 at opposite ends thereof, as best shown in FIGS. 9–11 of the drawings.

Each curvilinear cam slot 81 is shaped and configured to receive a complementary shaped cam means that is, itself, attached to the supporting frame 3. Specifically, and with reference to FIG. 13 of the drawings, a fence lock handle 15 is shown as including a pivoting finger lever 83 for rotatably threading and unthreading a threaded cam shaft member 85 relative to the supporting frame 3. Each cam shaft member 85 includes a cam bushing 87 which is slidably mounted relative to an associated curvilinear cam slot 81, at each end of the supporting fence 13. Each cam bushing 87 includes a first portion 91 rotatably received within the curvilinear cam slot 81 and a second portion 93 larger than the first portion 91 and slidably mounted relative to an upper surface of the horizontally directed fence supporting section 65 or 67, above and in the vicinity of an associated curvilinear cam slot 81.

Note that in FIG. 13 of the drawings, the area between the first and second portions 91, 93 of the cam bushing 87 is angularly offset relative to the longitudinal axis thereof as at 95, such that each cam shaft member 85 and associated cam bushing 87 are positioned at an angle when threadably mounted relative to the supporting frame 3. It is this generally offset interconnecting surface 95, between the first and second portions 91, 93 of the cam bushing 87, that engages the horizontally directed supporting section 65 or 67 above and in the vicinity of the curvilinear cam slot 81, while the first portion 91 is slidably received within the curvilinear cam slot 81.

Both prior to and following use, the pivoting finger lever 83 of the fence lock handle 1 is rotated to tighten the threaded cam member 85 into the supporting frame 3 in order to force the angularly offset surface 95 against the horizontally directed support section 65 or 67, above and in the vicinity of the curvilinear cam slot 81, so as to keep the work supporting fence 13 from moving. When it is desired to use the improved compound miter saw 1, the threaded cam member 85 is slightly loosened by the finger engaging leaver 83 so as to allow the first portion 91 of the cam bushing 87 to be freely slidably movable within the curvilinear cam slot 81, while the angularly offset surface 95 is also freely slidably movable with respect to the upper surface of the horizontally directed fence support section 65 or 67, above and in the vicinity of its respective curvilinear cam slot 81. Thus, the work supporting fence 13 is capable of being moved in a curvilinear path at opposite ends thereof corresponding to the shape of the curvilinear cam slots 81, while the cam shaft member 85 and associated cam bushing 87 are maintained in confined and controlled movement for operation, as desired.

In order to understand the combined transverse and longitudinal movement of the work supporting fence 13 relative to the turntable 7, including associated power driven saw blade 17 and saw blade slot 9 used therewith, attention is now directed to FIG. 9–10 of the drawings. It will be seen that the upper blade guard and housing 19, including all related components, have been disassembled from the turntable 7, so as to facilitate an understanding of the aforementioned combined transverse and longitudinal movement. It will be noted that a pair of spaced holes 97, 97 are provided in the turntable 7 for receiving the pair of bolts 41, 41 which mount the upper blade guard and housing 19 to the turntable 7. These pair of holes 97, 97 are shown in an approximate 12 o'clock position in FIG. 9 of the drawings when the miter scale pointer 11 is shown as being located in a 0° position. At this position, there is no miter cutting. However, when the turntable 7 is rotated (by the handle 27) to the right or left of the 0° position shown in FIG. 9, the turntable 7 and included power driven saw blade 17, with associated saw blade slot 9, are also moved in the same direction and to the same degree. As shown in the drawings and most miter cuts, the turntable 7 is capable of being rotated to provide miter cutting from 0°–45° both to the left and right of the 0° position shown in FIG. 9. Note that the pair of holes 97, 97 are moved to an approximate 1:30 o'clock position in FIG. 10 of the drawings, when the turntable 7 is moved to the left, for 45° miter cutting.

When at the 0° miter position as shown in FIG. 9, the first portion 91 of each cam bushing 87 is positioned in an approximate center or mid-point of the curvilinear cam slot 81. When the turntable 7 is rotated to the left from the 0° position to a position of 45°, as shown in FIG. 10 of the drawings, the first portion 91 of each cam bushing 87 is shown as being positioned nearly to the left uppermost extent of each associated cam slot 81. Similarly, if the turntable 7 were moved to the right to a 45° position, the first portion 91 of each cam bushing would be positioned in the right uppermost position of each curvilinear cam slot 81. Of course, the turntable 7 may be moved to any position intermediate the zero to 45° position shown so as to obtain the desired miter cut, and in so doing, the first portion 91 of each cam bushing 87 will be positioned in a corresponding manner, as each curvilinear slot 81 is moved by the fence 13.

It will be noted that although the turntable 7 moves through a 45° angle, such as shown in FIGS. 9–10, the work supporting fence 13 is maintained in a predetermined relative position to the saw blade slot 9 and the power driven saw blade 17. This is due to the mounting of the work supporting fence 13 relative to the rotatable mount 8 of the turntable, as well as the curvilinear cam slots 81, 81 at opposite ends of the work supporting fence 13. Thus, as the turntable 7 is rotated, the work supporting fence 13 is rotated relative to the turntable 7 at its eccentric or off center position, with the curvilinear cam slots 81, in conjunction with each cam bushing 87 permitting adjustment of the work supporting fence 13 to the right or left of the rotatable mount 8 of the turntable 7. As shown in FIG. 10 of the drawings, the work supporting fence 13 is shifted to the right when the first portion 91 of each cam bushing 87 is located in the left uppermost position of each curvilinear cam slot 81. Shifting to the left would occur when the first portion 91 of each cam bushing 87 is located in the right uppermost position of each curvilinear cam slot 81.

As the result of the construction of the work supporting fence 13 relative to the turntable 7 and the supporting frame 3, the work supporting fence 13 is automatically adjusted in a combined longitudinal and transverse movement relative to the power driven saw blade 17 and associated saw blade slot 9 so as to maintain the work supporting fence 13, as shown in FIG. 9-10 of the drawings, in a predetermined relative position to the power driven saw blade 17 and associated saw blade slot 9, as the turntable 7 and including power driven saw blade 17 and associated saw blade slot 9 are selectively rotated on the supporting frame 3 to various desired miter positions.

Because the work supporting fence 17 is metal die casted into the shape shown in the drawings, a die parting line 99 is shown in FIG. 11 along lower and upper portions of each curvilinear cam slot 81 and serves as a curvilinear edge in cooperation with the first portion 91 of each cam bushing 87 to provide coordinated and precise aligned sliding movement of each cam bushing 87 relative to a curvilinear cam slot 81. The angularly offset section 95 between the first and second portions 91, 93 of each cam bushing 87 also slidably engages the horizontally directed supporting section 65 above and in the vicinity of each curvilinear cam slot so as to maintain the relative position of each cam member 85 and associated cam bushing 87 relative to its respective curvilinear cam slot 81.

In addition to the simultaneous coordinated or automatically adjustable combined longitudinal and transverse movement of the work supporting fence 13 relative to the turntable 7 and supporting frame 3 as described above, the present invention also discloses a miter detent mechanism for selectively releasably engaging the turntable and included power driven saw blade 17 relative to the supporting frame 3 at various pre-selected miter positions of the power driven saw blade 17 and the work supporting fence 13.

In this regard, attention is directed to FIGS. 14-16 of the drawings. FIG. 14a of the drawings shows a leaf spring activated interengaging means generally identified by the numeral 101 attached to the supporting frame 3 in the complementary opening 103 that receives the turntable 7. In particular, such means include a spring 105 which is attached at one end 107 by the threaded fasteners 109 to the supporting frame 3, within the turntable opening 103. The second end 111 is shown in FIG. 15 as being spring biased upwardly, and includes a ball detent 113 for engaging complementary configured holes 115 in the turntable 7 at various preselected miter positions.

As shown in FIG. 14b of the drawings, interconnecting struts in the underportion of the turntable 7 include a curvilinear strut 117 having a series of formed or drilled holes 115, so as to engage the ball detent 113 of the leaf spring engaging means 101 at various preselected miter positions.

There are 5 complementary shaped holes 115 shown in the turntable 7 in FIG. 14b of the drawings so as to enable the ball detent 113 to engage the turntable 7 at a 0° position and at positions 22.5° and 45° to the left and right of the 0° position.

As shown in FIG. 16 of the drawings, the leaf spring 105 includes a pair of spaced holes 119, 119 for receiving the threaded fasteners 109 so as to mount same to the supporting frame 3. At the free end of the leaf spring 105, a transverse slot 121 is provided which is slightly larger in dimension perpendicular to turntable rotation than the ball detent 113 so as to provide self-locating positioning of the ball detent 113 relative to the complementary configured holes 115 in the turntable.

The miter detent mechanism described above provides superior feel in moving the turntable by the handle 27, while also providing accurate positioning and zero slop tolerance. Within the available room in a compact compound miter saw construction, a leaf spring permits a lower spring rate for a given force, coupled with continuing action at a large radius on the turntable, when compared to a compression spring design. Further, the ball detent 113 is larger than the receiving hole 121 to provide for zero slop tolerance in the miter detent mechanism, while the ball detent 113 is capable of moving in the radial dimension of the table, along the transverse slot 121, to provide a self-locating ball detent for selective releasable engagement between the turntable 7 and supporting frame 3.

From the foregoing, it can be seen that the miter detent mechanism, as best shown in FIGS. 14-16 of the drawings, provides for selective releasable engagement of the turntable 7 and included power driven saw blade 17 relative to the supporting frame 3 at various preselective miter positions of the power driven saw blade 17 relative to the work supporting fence 13. As disclosed, the miter detent mechanism includes a leaf spring activated interengaging means 101 including a self-locating ball detent for the selective releasable interengagement between the turntable 7 and the supporting frame 3. Coupled with the aforementioned simultaneous coordinated or automatically adjustable longitudinally and transversely movable work supporting fence 13, in order to maintain the work supporting fence 13 in a predetermined relative position to the power driven saw blade 17 during selective rotation thereof relative to the supporting frame 3, the improved compound miter saw 1 of the present invention provides several important features and advantages over prior art compound miter saws, which will now be completely understood.

In view of the above, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

I claim:

1. A compound miter saw apparatus comprising, a supporting frame, a turntable selectively rotatably mounted on said supporting frame, a power driven saw blade pivotally mounted on said turntable along a predetermined path relative to said turntable, said turntable having saw blade slot means for receiving the power driven saw blade therein, said turntable being selectively rotated on said supporting frame to various desired miter positions of said power driven saw blade, a work supporting fence mounted on said supporting frame and including a pair of work engaging surfaces longitudinally aligned across the saw blade slot means, said work supporting fence including means for simultaneous coordinated longitudinal and transverse movement relative to said power driven saw blade so as to maintain said work supporting fence in a predetermined relative position to said power driven saw blade as said turntable and included power driven saw blade are selectively rotated on said supporting frame to various desired miter positions, and said means for simultaneous coordinated longitudinal and transverse movement including cooperative cam means associated with opposite ends of said work supporting fence to provide said aforesaid simultaneous coordinated longitudinal and transverse movement of said work supporting fence relative to the power driven saw blade.

2. The apparatus as defined in claim 1 wherein the work supporting fence is rotatably mounted to said turntable at a location eccentrically offset from the center of axis of rotation of said turntable.

3. The apparatus as defined in claim 1 wherein the opposite ends of said work supporting fence include curvilinear cam slots for receiving a cam shaft member therein, and each said cam shaft member being attached to said supporting frame for controlling the movement of said work supporting fence along the curvilinear slots at each end thereof.

4. The apparatus as defined in claim 3 wherein each cam shaft member includes a cam bushing slidably mounted within an associated curvilinear slot of said work supporting fence.

5. The apparatus as defined in claim 4 wherein each cam bushing includes a first portion slidably mounted within an associated curvilinear slot and a second portion also slidably mounted relative to said work supporting fence above and in the vicinity of an associated curvilinear slot.

6. The apparatus as defined in claim 5 wherein each curvilinear slot includes a curvilinear edge for cooperative sliding mating engagement with an associated cam bushing.

7. The apparatus as defined in claim 6 wherein each cam shaft member and associated cam bushing are angularly positioned relative to said supporting frame and include an angularly offset surface between the first and second portions of each said cam bushing for cooperative engagement with said work supporting fence above and in the vicinity of an associated curvilinear slot.

8. The apparatus as defined in claim 7 wherein each cam shaft member and associated cam bushing are adjustably threadably mounted relative to said turntable.

9. The apparatus as defined in claim 8 wherein said work supporting fence includes an interconnecting web section between said pair of work engaging surfaces, said interconnecting web section including a depending element which is partially circularly-shaped for reception within a complementary shaped opening provided in said turntable for rotatably mounting said work supporting fence relative to said turntable.

10. The apparatus as defined in claim 9 wherein said saw blade slot means in said turntable includes an elongated slot for receiving said saw blade and an adjacent opening connected to said elongated slot and underlying said work supporting fence.

11. The apparatus as defined in claim 10 wherein said work supporting fence has a complementary opening generally vertically aligned with the adjacent opening of said saw blade slot means in said turntable.

12. A compound miter saw apparatus comprising, a supporting frame, a turntable selectively rotatably mounted on said supporting frame, a power driven saw blade pivotally mounted on said turntable along a predetermined path relative to said turntable, and said turntable having saw blade slot means for receiving the power driven saw blade therein, a work supporting fence mounted on said supporting frame and including a pair of work engaging surfaces longitudinally aligned across the saw blade slot means, said work supporting fence including means for simultaneous coordinated longitudinal and transverse movement relative to said power driven saw blade as said turntable and included power driven saw blade are selectively rotated on said supporting frame to various desired miter positions, said means including an interconnecting web section between said pair of work engaging surfaces having a depending partially circularly-shaped element for reception within a complementary shaped opening of said turntable for rotatably mounting said work supporting fence to said turntable, the complementary shaped opening in said turntable being eccentrically offset from the center of axis of rotation of said turntable, and said means further including curvilinear slots provided in said work supporting fence at opposite ends thereof for receiving a cam shaft member attached to said supporting frame, each said cam shaft member having a cam bushing for slidable movement within an associated curvilinear slot, thereby providing simultaneous coordinated longitudinal and transverse movement of said work supporting fence relative to said power driven saw blade for maintaining the work supporting fence in a predetermined relative position to said power driven saw blade during various desired miter positions of said turntable and included power driven saw blade.

13. In a compound miter saw apparatus including, a supporting frame, a turntable selectively rotatably mounted on said supporting frame, a power driven saw blade pivotally mounted on said turntable along a vertical path relative to said turntable, said turntable having saw blade slot means for receiving the power driven saw blade therein, said turntable being selectively rotated on said supporting frame to various desired miter positions of said power driven saw blade, and a work supporting fence mounted on said supporting frame and including a pair of work engaging surfaces longitudinally aligned across the saw blade slot means, the improvement comprising: means for simultaneous coordinated longitudinal and transverse movement of said work supporting fence relative to said power driven saw blade so as to maintain said work supporting fence in a predetermined relative position to said power driven saw blade as said turntable and included power driven saw blade are selectively rotated on said supporting frame to various desired miter positions, and said means for simultaneous coordinated longitudinal and transverse movement including cooperative cam means associated with opposite ends of said work supporting fence to provide said aforesaid simultaneous coordinated longitudinal and transverse movement of said work supporting fence relative to said power driven saw blade.

14. The improvement as defined in claim 13 wherein the work supporting fence is also rotatably mounted to said turntable at a location eccentrically offset from the center of axis of rotation of said turntable.

15. The improvement as defined in claim 14 wherein the opposite ends of said work supporting fence include curvilinear slots for receiving a cam shaft member therein, and each said cam shaft member being attached to said supporting frame and having a cam bushing mounted therein for slidable movement relative to an associated curvilinear slot so as to control the movement of said work supporting fence along said curvilinear slots at each end thereof.

16. A compound miter saw apparatus comprising, a supporting frame, a turntable selectively rotatably mounted on said supporting frame, a power driven saw blade pivotally mounted on said turntable along a predetermined path relative to said turntable, said turntable having saw blade slot means for receiving the power driven saw blade therein, a work supporting fence mounted on said supporting frame and including a pair of work engaging surfaces longitudinally aligned across the saw blade slot means, said work supporting fence being mounted for movement relative to said power driven saw blade so as to maintain said work supporting fence in a predetermined relative position to said power driven saw blade as said turntable and included power driven saw blades are selectively rotated on said supporting frame to various desired miter positions, and said work supporting fence being rotatably mounted to and structurally supported by said turntable while also being mounted to said supporting frame for movement in a curvilinear path at opposite ends thereof, in order to provide a simultaneous coordinated longitudinal and transverse movement of said work supporting fence relative to said power driven saw blade.

17. The apparatus as defined in claim 20 wherein said work supporting fence includes a downwardly extending, partially-circularly shaped element for reception within a complementary shaped opening provided in said turntable for rotatably mounting said work supporting fence to said turntable, and the opposite ends of said work supporting fence including curvilinear slots for receiving a cam shaft member each of which is mounted to said supporting frame for controlling the movement of said work supporting fence along the curvilinear slots at each end thereof.

18. In a compound miter saw apparatus including, a supporting frame, a turntable selectively rotatably mounted on said supporting frame, a power driven saw blade pivotally mounted on said turntable along a predetermined path relative to said turntable, said turntable having saw blade slot means for receiving the power driven saw blade therein, a work supporting fence mounted on said supporting frame and including a pair of work engaging surface longitudinally aligned across the saw blade slot means, and said work supporting fence being mounted for movement relative to said power driven saw blade so as to maintain said work supporting fence in a predetermined relative position to said power driven saw blade as said turntable and included power driven saw blade are selectively rotated on said supporting frame to various desired miter positions, the improvement comprising: cooperative cam means associated with opposite ends of said work supporting fence to provide said aforementioned movement of said work supporting fence relative to said power saw blade, and said work supporting fence being rotatably mounted to and structurally supported by said turntable during its movement relative to said power driven saw blade.

19. A compound miter saw apparatus, comprising a supporting frame, a power driven saw blade pivotally mounted on said turntable along a predetermined path relative to said turntable, aid turntable having a saw blade slot means for receiving the saw blade therein, a work supporting fence mounted on said supporting frame and including a pair of work engaging surfaces longitudinally aligned across the saw blade slot means, and means for selectively releasably engaging said turntable and included power driven saw blade to said supporting frame at various pre-selected miter positions of said power driven saw blade relative to said work supporting fence, said means including spring biased, self- locating detent means for selective releasable interengagement between said turntable and said supporting frame, said spring-biased, self-locating detent means including a leaf spring attached at one end to said supporting frame and a ball detent positioned for limited movement in a transverse slot at a free end of said leaf spring, said ball detent being slightly larger than said transverse slot in a dimension perpendicular to turntable rotation in order to provide self-locating positioning of said ball detent relative to complementary configured holes formed in said turntable.

20. A compound miter saw apparatus, comprising a supporting frame, a turntable selectively rotatably mounted on said supporting frame, a power driven saw blade pivotally mounted on said turntable along a predetermined path relative to said turntable, said turntable having saw blade slot means for receiving the saw blade therein, a work supporting fence mounted on said supporting frame and including a pair of work engaging surfaces longitudinally aligned across the saw blade slot means, and means for selectively releasably engaging said turntable and included power driven saw blade to said supporting frame at various pre-selected miter positions of said power driven saw blade relative to said work supporting fence, said means including leaf spring biased, self-locating detent means between said turntable and supporting frame for interengagement with one another at said pre-selected miter positions, said leaf spring being attached at one end to said supporting frame and having a second free end for receiving a ball detent positioned to engage complementary configured holes in said turntable at said various pre-selected positions, said ball detent being mounted for limited movement in a transverse slot at the free end of said leaf spring, said ball detent being slightly larger than said transverse slot in a dimension perpendicular to turntable rotation in order to provide a self-locating and selective releasable interengagement between said turntable and said supporting frame.

21. In a compound miter saw apparatus, comprising a supporting frame, a turntable selectively rotatably mounted on said supporting frame, a power driven saw blade pivotally mounted on said turntable along a path relative to said turntable, said turntable having saw blade slot means for receiving the saw blade therein, and a work supporting fence mounted on said supporting frame and including a pair of work engaging surfaces longitudinally aligned across the saw blade slot means, the improvement comprising: means for selectively releasably engaging said turntable and included power driven saw blade to said supporting frame at various pre-selected miter positions of said power driven saw blade relative to said work supporting fence and including spring-biased, self-locating detent means for selective releasable interengagement between said turntable and said supporting frame, said spring-biased, self-locating detent means including a leaf spring attached at one end to said supporting frame and a ball detent positioned for limited movement in a transverse slot at a free end of said leaf spring, said ball detent being slightly larger than said transverse slot in a dimension perpendicular to turntable rotation in order to provide a self-locating positioning of said ball detent relative to complementary configured holes formed in said turntable.

* * * * *